Patented Feb. 8, 1944

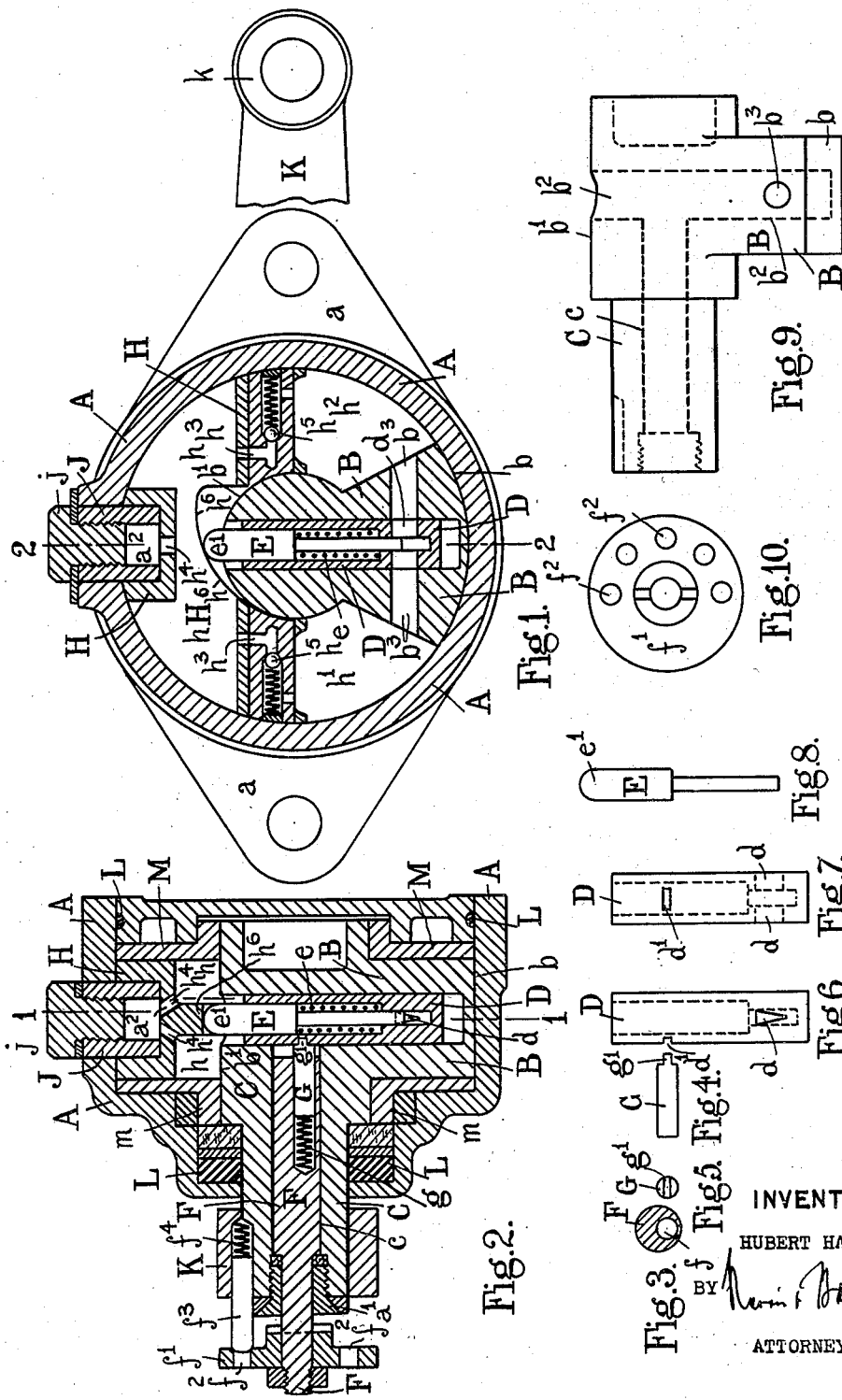

2,341,096

UNITED STATES PATENT OFFICE 2,341,096

DOUBLE-ACTING HYDRAULIC SHOCK ABSORBER FOR VEHICLES

Hubert Haywood, Wirksworth, England

Application January 14, 1943, Serial No. 472,369
In Great Britain February 9, 1942

5 Claims. (Cl. 188—89)

This invention relates to improvements in double acting hydraulic shock absorbers particularly applicable for controlling the suspension springs of motor and other road vehicles.

The objects of the invention are the application of hydraulic means for controlling the deflection and rebound of vehicle suspension springs in a progressive manner most suitable to each and to automatically adjust the retarding effect of the hydraulic medium to varying loads whereby road wheel displacement automatically increases the resistance of the shock absorber proportionately to the extent of the displacement and the provision of external means which are readily accessible for adjusting the mean pressure of the device.

According to the invention the shock absorber comprises a rotor adapted to oscillate in a casing according to relative movement of the sprung and unsprung parts of the vehicle, the rotor being provided with a vane moving between two stationary abutments, or two parts of one stationary abutment, forming two closed compartments filled with hydraulic fluid, one on each side of the vane, a passage through the vane being progressively closed or opened according to the direction of movement of the vane by a valve operated by such movement to allow the quantity of the hydraulic fluid flowing from one compartment to the other as the vane moves to be gradually increased or decreased and consequently the resistance to movement of the rotor to be correspondingly increased or decreased.

Such construction permits an initial low resistance to deflection of the suspension springs and a maximum resistance to initial rebound, the resistance gradually decreasing to the normal relative positions of sprung and unsprung weight of the vehicle.

The invention is illustrated in and will be described with reference to the accompanying drawing showing one embodiment thereof. In this drawing:

Fig. 1 is a transverse section on line 1—1 Fig. 2,

Fig. 2 is a longitudinal section on line 2—2 Fig. 1,

Fig. 3 is a transverse section of the spindle F for adjusting the mean setting of the controlling valve, Figs. 4 and 5 are side elevation and end elevation respectively of the pin G operated by the spindle F, Figs. 6 and 7 are a front elevation and a side elevation respectively of a sleeve D in oscillating rotor B the position of which sleeve is controlled from the spindle F through the pin G, Fig. 8 is an elevation of the controlling valve E, Fig. 9 is a front elevation of the oscillating rotor B, Fig. 10 is a front elevation of knurled knob $f^1$.

The mechanism of the shock absorbing device is housed in a cylindrical casing A having flanges $a$ by which it is bolted to the chassis frame or other sprung part of the vehicle.

Within the casing A and adapted to oscillate therein is mounted a rotor B having a portion $b$ of the same radius as the inner peripheral surface of the casing A and a portion $b^1$ of smaller radius, the two portions being formed integrally with a shaft C projecting through one end of the casing A.

The portion $b$ is of considerably smaller angular width than the portion $b^1$ and forms a vane contacting with and oscillating over the inner surface of the casing A. The radius of the portion $b^1$ corresponds with the radius of the inner surface of a fixed abutment H extending transversely across the casing A. The construction and purpose of this abutment will be described later.

A diametrical hole $b^2$ is formed in the rotor B such hole extending from the periphery of the part $b^1$ deep into the vane $b$ and the shaft C is formed with a longitudinal hole $c$ extending from its outer end to the aforesaid diametrical hole $b^2$. A hole or passage $b^3$ also extends from one radial edge of the vane $b$ to the other, intersecting the holes $b^2$.

A sleeve D closed at its lower end is arranged diametrically in the hole $b^2$ being a tight sliding fit therein, this sleeve extending from near the top of the hole to below the passage $b^3$ in the vane. A narrow passage $d$ is formed in the sleeve D in a position which registers more or less with the passage $b^3$ in the vane according as to the position of the sleeve D in the hole $b^2$. The passage $d$ is preferably, though not necessarily, triangular in cross section as shown in Figs. 2 and 6.

The inner diameter of the sleeve D is less in the lower part than in the upper part, the part of smaller diameter extending a short distance above and below the passage $d$. A needle valve E loaded by a spring $e$ is located within the sleeve D being an easy sliding fit therein, the lower end of this valve being reduced in diameter to enter the lower end of the sleeve D to more or less obstruct the free communication between the two sides of the passage $d$ according as to how far it has penetrated thereinto. The upper end of the needle valve E projects beyond the top of the sleeve and the surface of the part $b^1$ of the rotor B, its outer end $e^1$ being preferably rounded or semi-spherical.

A spindle F which is co-axial with the shaft C is located in the axial passage $c$ therein extending through the gland $a^1$ and beyond the outer end of the shaft. An eccentrically arranged hole $f$ is formed in the inner end of the spindle F and a pin G pressed outwards by a light spring $g$ is situated in the hole $f$. The end of the pin G is formed with a rectangular projection $g^1$ which is pressed by the spring $g$ into a correspondingly shaped recess $d^1$ in the surface of the sleeve D. Thus by rotating the spindle F the sleeve D can be raised or lowered within the hole $b^2$ in the rotor B thereby adjusting the aperture $d$ in relation to the lower end of the needle valve E. A knurled disc or knob $f^1$ is affixed on the end of the spindle F by which the latter can be rotated. A number of holes or recesses $f^2$ are formed in the disc or knob $f^1$ adapted to be engaged by the end of a pin $f^3$ pressed outwards by a spring $f^4$ slidably mounted at the end of the shaft C. The engagement of the pin $f^3$ in one of the holes $f^2$ will locate and maintain the knob $f^1$ and consequently the sleeve D in any desired position.

A stationary member or abutment H housed in the cylindrical casing A closes the space intermediate the small radius portion $b^1$ of the rotor B and the bore of the casing, and forms three separate compartments therein, viz. the compartment $h$ above the abutment and the compartments $h^1$ and $h^2$ one at each side of the vane $b$. Passageways $h^3$ in the abutment H form a communication between the compartment $h$ and the two compartments $h^1$ and $h^2$, these passageways being provided with spring loaded non-return valves $h^5$ to prevent passage of liquid from either of the compartments $h^1$ or $h^2$ into the compartment $h$.

The under surface $h^6$ of the central web of the abutment H is curved as shown in Fig. 1, and this curved surface $h^6$ forms a track for and is engaged by the rounded end $e^1$ of the needle valve E.

The compartments $h$, $h^1$ and $h^2$ are filled with hydraulic liquid preferably oil through an aperture $a^2$ in the top of the casing A. The aperture $a^2$ is lined with a ferrule J which projects into the abutment H and prevents movement of the latter relative to the casing A. Apertures $h^4$ are formed in the abutment H for the passage of the oil therethrough into the compartment $h$. The ferrule J is normally closed by a plug $j$ screwed into the outer end thereof.

When filling the device the oil is forced into the compartment $h$ with sufficient pressure to overcome the spring loaded valves $h^5$ whereby the compartments $h^1$ and $h^2$ become completely filled with oil. The compartment $h$ serves as a replenishment chamber for the compartments $h^1$ and $h^2$ should any oil leak or escape therefrom when the device is in operation.

An arm K is affixed to the outer end of the rotor shaft C, the free end $k$ of this arm being connected by a jointed link or in any other suitable way to the axle or other unsprung part of the chassis so that any relative movement of the sprung and unsprung parts of the chassis, i. e., any deflection and rebound of the suspension spring will cause an oscillation of the rotor B.

Since the needle valve E is carried in the rotor B it will oscillate therewith, its rounded head $e^1$ engaging with the curved track $h^6$ on the abutment H. Consequently the greater the deflection and rebound of the suspension spring the greater will be the movement of the needle valve in the rotor B as its spherical head $e^1$ is kept in contact with the curved track $h^6$ by the valve spring $e$.

In one direction of movement of the rotor B the curved track in the fixed member permits the valve to progressively open the passage $d$ in the sleeve D and in the other direction of movement of the rotor B the valve E will progressively close the passage $d$. Thus as the valve E opens and closes according to the direction of rotation of the rotor B and governed by the curved track $h^6$ in the abutment H acting on the head of the valve so that the amount of oil which can pass from the compartment on one side of the vane $b$ to the compartment on the other side thereof gradually increases or decreases and the resistance to movement of the rotor B correspondingly increased or decreased.

Mean resistance is set and determined by rotating the external knurled disc $f^1$ which action enlarges or reduces the narrow passage $d$ in the sleeve D through which the oil passes from one compartment $h^1$ or $h^2$ to the other. Half a turn of the disc $f^1$ gives a maximum movement to the spindle F and consequently through the eccentrically mounted pin G to the sleeve D.

Assuming the pin G to be in the lowest position as shown in Fig. 2, the narrow vertical aperture $d$ through the sleeve D would be fully open. Subsequent movement of the disc $f^1$ would therefore, notch $f^2$ by notch $f^2$, reduce the space between the lower end of the narrow aperture $d$ and the lower end of the needle valve E and the mean resistance correspondingly increased.

Mean resistance having been set the dimension of the passage $d$ through the sleeve D varies accordingly to the position of the needle valve E which as hereinbefore described varies in relation to the deflection and rebound of the suspension spring and to the varying loads on the vehicle which determine the relation of sprung and unsprung weight.

Escape of oil from the casing A is prevented by the resilient seals or packings L and these seals or packings are isolated from the pressure of the oil in the compartments $h^1$ and $h^2$ at each side of the vane $b$ of the rotor B by discs or flanges M fitting accurately into the bore of the casing A and abutting each side of the vane $b$ and fixed to the rotor shaft C and to the vane. Bosses $m$ on each disc or flange M provide adequate bearing surfaces for the rotor.

I claim:

1. A double acting hydraulic shock absorber for vehicles comprising a cylindrical casing, adapted to be affixed to a sprung part of the frame of the vehicle, a rotor capable of being oscillated within said casing, said rotor having a portion of small radius and a portion of larger radius equal to the radius of the bore of the cylinder forming a vane, two fixed abutments forming with the vane a compartment on each side thereof filled with hydraulic fluid, a transverse passage through the vane, a valve, controlled by the position of the vane relative to the casing, located in said passage whereby the amount of liquid flowing through passage increases or decreases according to the direction of angular movement of the rotor and means for connecting the rotor to an unsprung part of the frame.

2. A double acting hydraulic shock absorber for vehicles comprising a cylindrical casing, adapted to be affixed to a sprung part of the frame of the vehicle, a rotor capable of being oscillated within said casing, said rotor having a portion of small radius and a portion of larger radius equal to the radius of the bore of the cylinder forming a vane, two fixed abutments forming with the vane a compartment on each side thereof filled with hydraulic fluid, a transverse passage through the vane, a valve, controlled by the position of the vane relative to the casing, located in said passage whereby the amount of liquid flowing through passage increases or decreases according to the direction of angular movement of the rotor, means for connecting the rotor to an unsprung part of the frame and externally operated means whereby the mean effective size of the passage through the vane and consequently the mean resistance to angular movement of the rotor can be adjusted.

3. A double acting hydraulic shock absorber for insertion between the sprung and unsprung parts of a motor vehicle comprising the combination with a cylindrical casing and means for securing same to a sprung part of the vehicle of a rotor adapted to oscillate in said casing, means for connecting said rotor to an unsprung part of the vehicle so that the rotor will oscillate on relative movement of the sprung and unsprung parts, a vane on said rotor, fixed abutments between which the vane oscillates and which form with the vane two closed compartments filled with hydraulic fluid, there being a passage through the vane connecting the said compartments, a needle valve located in the vane adapted to vary the effective cross sectional area of the passage therethrough, and a flange on the member forming the fixed abutments, said flange carrying a fixed curved surface engaged by the head of the needle valve, the curvature of said surface being such that as the rotor oscillates the valve will move in relation to the passage in the vane to vary the effective cross sectional area thereof and consequently the resistance to angular movement of the vane.

4. A double acting hydraulic shock absorber for insertion between the sprung and unsprung parts of a motor vehicle comprising the combination with a cylindrical casing and means for securing same to a sprung part of the vehicle of a rotor adapted to oscillate in said casing, means for connecting said rotor to an unsprung part of the vehicle so that the rotor will oscillate on relative movement of the sprung and unsprung parts, a vane on said rotor, fixed abutments between which the vane oscillates and which form with the vane two closed compartments filled with hydraulic fluid, there being a passage through the vane connecting the said compartments, a sleeve arranged radially in said vane and substantially at right angles to the passage therethrough, a corresponding aperture being formed through the sleeve, externally controlled means for moving the sleeve in the vane, a needle valve located in the sleeve adapted to vary the effective cross sectional area of the aperture therethrough, the movement of the sleeve by the externally controlled means setting its position relative to the needle valve for a given load on the vehicle, and a flange on the member forming the fixed abutments, said flange carrying a fixed curved surface engaged by the head of the needle valve, the curvature of said surface being such that as the rotor oscillates the needle valve will move in the sleeve in relation to the aperture therein to vary its effective cross sectional area of the aperture from that initially set by the adjustment of the sleeve in the vane and consequently vary the resistance to angular movement of the vane and rotor according to the relative movement between the sprung and unsprung parts of the vehicle.

5. A double acting hydraulic shock absorber for insertion between the sprung and unsprung parts of a motor vehicle comprising the combination with a casing of a vane capable of oscillating therein, fixed abutments between which the vane oscillates and which with the vane form closed compartments filled with hydraulic liquid at each side of the vane, means for the passage of hydraulic fluid from one compartment to the other as the vane oscillates, a valve varying the effective size of said passage as the vane oscillates, a flange on the member forming the fixed abutments, said flange carrying a fixed curved surface engaged by said valve to control the position of the valve relative to the passage as the vane oscillates, means for setting the mean position of the valve in relation to the passage according to the predetermined load between the sprung and unsprung parts of the vehicle and externally operated means for controlling the aforesaid setting means.

HUBERT HAYWOOD.